INDUCTIVE CIRCUIT COMPONENT

Filed Sept. 15, 1967 2 Sheets-Sheet 1

Sigfrid Schweizerhof
Inventor:

By: Spencer & Kaye
Attorneys

INDUCTIVE CIRCUIT COMPONENT

Filed Sept. 15, 1967 2 Sheets-Sheet 2

Sigfrid Schweizerhof
Inventor:

By: Spencer & Kaye
Attorneys

United States Patent Office 3,505,569
Patented Apr. 7, 1970

3,505,569
INDUCTIVE CIRCUIT COMPONENT
Sigfrid Schweizerhof, Backnang, Germany, assignor to Telefunken Patentverwertungsgesellschaft m.b.H., Ulm (Danube), Germany
Filed Sept. 15, 1967, Ser. No. 668,057
Claims priority, application Germany, Sept. 30, 1966, T 32,157
Int. Cl. H02b *1/04, 9/00*
U.S. Cl. 317—101 5 Claims

ABSTRACT OF THE DISCLOSURE

An inductive circuit component having one or more insulated annular windings which is or are completely encased, except for a gap, by one or more layers of a metallic, magnetic material which layer or layers form a closed magnetic core linking the windings, the gap being arranged so that the core does not form a short-circuited secondary winding.

With the present trend towards miniaturization and integration of components and circuits, particularly those for use at high frequency, inductive components with closed ferromagnetic cores, that is to say coils and transformers, are known to be at a great disadvantage in comparison with resistors, capacitors and semiconductors. Efforts are already being made to replace the inductive components by more complicated circuits composed of the latter components. Since such circuits involve other disadvantages, however, and will presumably only be suitable for certain applications, the problem arises of seeking improved forms and production techniques for inductive components.

The disadvantages of the conventional inductive components relate primarily to the form of winding which, as dimensions decrease, leads to an ever greater loss of space through coil formers and reinforced windings ends, while the changeover to small ring cores for transformers leads to the use of expensive, special winding machines or even to tedious winding by hand. As regards shape, a conventionally produced coil is often poorly adapted to the requirements of modern circuitry. Thus, modular circuits, in which conductor paths, resistors and capacitors are printed on thin ceramic supporting plates which plates, after being equipped with further components, are stacked, require flat coils and transformers, the production of which should, as far as possible, be adapted for integrated manufacture.

It is true that attempts have already been made to replace a conventional winding by printing on a core but the spatially complicated wrapping many times round the core leads to considerable difficulties, particularly in the case of iron-cored circuits, if an attempt is made to integrate this technique and render it automatic.

It is further known (Steige, Mikroelektronik, Munich (1965)), to produce a coil in the form of a printed spiral to surround it with a closed ferrite core consisting of two dish-shaped parts which fit closely together at the edges with a core also penetrating through the coil. If such a core is to fulfil its purpose, however, the two parts must be ground in order to obtain a satisfactory magnetic connection at the contact points, which grinding is however expensive.

The object of the invention is therefore, to provide an inductive component having a closed ferromagnetic core, particularly for high frequency, which can be produced by a largely integrated, economic technique, and which at the same time permits great freedom in shape and in particular is favourable to a very flat shape. According to the invention, there is provided an inductive circuit component having one or more insulated annular windings which is or are completely encased, except for a gap, by one or more layers of a metallic, magnetic material which layer or layers form a closed magnetic core linking the windings, the gap being arranged so that the core does not form a short-circuited secondary winding.

In addition, the invention provides a method of making an inductive circuit component which includes the step of encasing an insulated annular winding with one or more layers of a metallic, magnetic material, and retaining or introducing an open-circuit gap in the layer or layers which is or are thus electrically discontinuous in the winding direction.

The magnetic layers are preferably applied electroless or galvanically. Before the magnetic layers are deposited on the surface of the coil, the cavities and irregularities therein are smoothed out by means of a suitable insulating coating.

It is true that it is already known to coat individual bare wires or even crosspoints of a plurality of insulated wires or printed conductors with a magnetic metal layer which is capable of storage. In contrast to this, however, the invention relates to the enveloping of prefabricated air core coils of any desired shape, which may consist of a plurality of windings, with a single-layer or multi-layer metallic magnetic deposit. The invention relates in particular to so-called linear inductive components, that is to say to coils for oscillatory circuits and filters as well as transformers, but it may also be used in the field of magnetic switching and storage elements. The advantages of a component according to the invention are considerable in the field of miniaturized and integrated circuits: the ferromagnetic "core" formed by the magnetic layers does not impose any restricting tolerances in contrast to normal cores; in addition, it is formed without special, expensive tools, yet is adapted to the most complicated and intricate coil structures. Since the magnetic casing layers may be formed by repeated dipping in different chemical baths and, with suitable formation, the winding can also be produced in a similar manner by means of the photo-etching technique, it is possible to use a homogeneous, integrated manufacturing technique with its corresponding economic advantages.

A component according to the invention may be constructed in many possible ways. The starting point may, for example, be a tiny conventional, cylindrical air-core coil which is wound without any supporting coil former and which may in turn consist of a plurality of component windings.

In order that the invention shall be clearly understood, various exemplary embodiments thereof will now be described with reference to the accompanying drawings in which.

Figure 1:
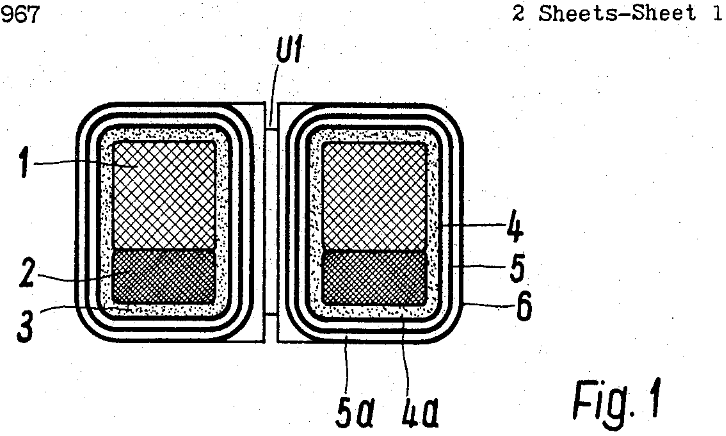
FIGURE 1 shows an axial cross section through a transformer.

FIGURE 1 shows diagrammatically an axial cross-section through a transformer with two transformer windings 1 and 2, a smoothing and insulating coating 3, three thin metallic magnetic layers 4, 5 and 6 and insulating intermediate layers 4*a*, 5*a*. The thickness and permeability or hysteresis loops of the magnetic layers must be adapted to the intended application and the frequency range, and their number must be adapted to the inductance required, that is to say to the maximum variation in flux required. For the sake of clarity, all the layers are represented with a greatly exaggerated thickness in FIGURE 1. The diameter of such a transformer can be very small, for example 3 mm. or even less. At U1, the metal layers are interrupted all around in the direction of the magnetic flux in order to prevent the development of unwanted eddy currents.

It is also easy to achieve extremely flat inductive components according to the invention such as are required for modern circuit techniques and which have not hitherto been available. For modular construction, already mentioned above, it is possible to start with a flat spiral winding, for example, which is etched out of a copper layer of a plastic foil around a central window. The foil is then coated with an insulating layer on all sides, and then electroless or galvanically encased with one or more magnetic layers each of which is insulated. Thus an extremely flat inductive component is obtained with a closed magnetic circuit and correspondingly little magnetic leakage to the outside. If a foil is used which has a copper layer on both sides, a pair of spiral windings having the same winding sense and situated close one above the other can be produced in one step and connected in series and then jointly encased with the magnetic layers. A flat transformer can be produced in the same manner if the function of the primary and of the secondary winding is allocated to the two spiral windings etched at both sides of the double copper-covered foil. A flat transformer with a relatively large number of turns and more than two windings can be made by etching all the windings in the form of double-sided spirals on double copper-covered foil around a window in the manner described above, then forming a physical unit with superimposed windows, after insulation of the conductors, by adhesion, and then coating jointly with the magnetic metal layers.

Figure 2:
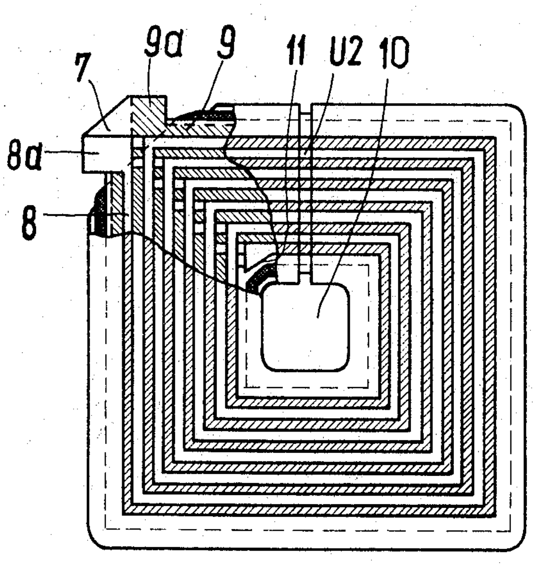
FIGURE 2 shows a plan view, partly broken away, of a flat inductive coil.
Figure 3:
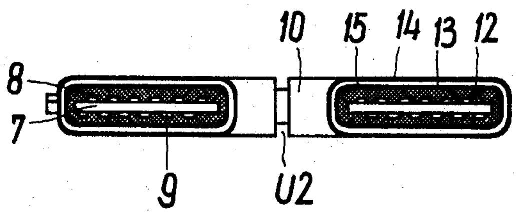
FIGURE 3 shows a section through the coil of FIGURE 2.

The self capacitance of such double spiral windings can be kept very low if the conductor paths at one side of the supporting foil are arranged to be opposite the gaps between the conductor paths at the other side. FIGURES 2 and 3 show an example of such a spiral coil. Spiral windings 8 and 9 etched out of the copper lining surround a central window 10 at the two sides of a supporting foil 7. They are connected to one another at their inner ends 11 by plating through, and have the same winding sense seen from one side. 8_a_ and 9_a_ are the ends of the spiral winding which can be connected to the circuit. In the interests of a low winding capacitance, the turns at both sides are staggered by the pitch width, and the cross-overs necessary in view of the winding sense are concentrated in a small radial area (visible diagrammatically in the cut-away zone in FIGURE 2). Coil and supporting foil are first enveloped in an insulating layer 12, the thickness of which should not be too small in view of the self-capacitance. It may be applied by lacquering for example, preferably by electrophoretic lacquering. Over this, there follow magnetic casing layers 13 and 14 which are separated from one another by an insulating intermediate layer 15. These intermediate layers, which require only low insulating capacity, may consist for example of lacquer or of copper oxide which is produced by electroless copper-plating with subsequent wet chemical oxidation. All the conductor paths and layers are illustrated with exaggerated thickness in FIGURE 3 in order to make them clearer. The deposition of the magnetic layers is effected in known manner. In the case of galvanic deposition, thus must be preceded in each case by the formation of a thin conducting under-layer, for example in the form of a thin copper plating deposited electroless. Since the majority of method steps referred to can be effected by dipping in baths, there is available a relatively homogeneous manufacturing technique which lends itself to automation.

Figure 4:
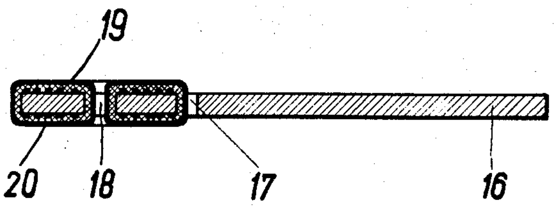
FIGURES 4 and 5 show respectively a section through and a plan view of a component built onto a board for carrying other printed circuit components.
Figure 5:
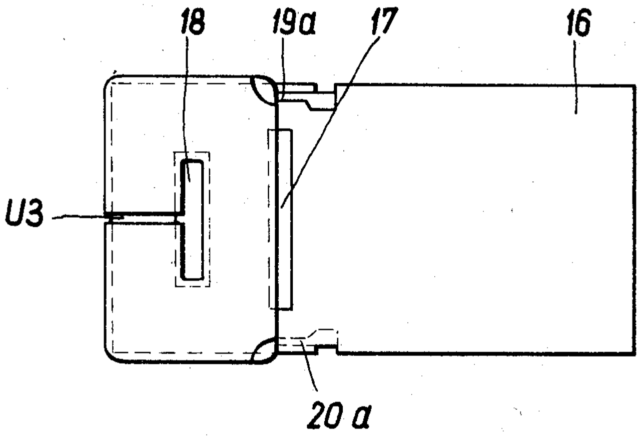

Coils of a similar kind may also be produced on thin ceramic supporting plates, giving a modular construction of a high electrical stability. In FIGURES 4 and 5, a ceramic supporting plate 16 is adapted to receive the coil according to the invention in its left-hand portion by means of a separating slit 17 and a window 18. A spiral winding 19 and 20 with its connection ends 19_a_ and 20_a_ is applied to one or both sides of the ceramic plate by the known screen-printing process and is fired in, as is the rest of the circuit on the right-hand portion of the plate which is left free. The winding may also consist of only one winding at one side of the plate. In the course of these operations, the winding is coated with an insulating glaze of adequate thickness ("cross-over dielectric"). When the complete screen-printed circuit is present, the spiral winding is finally encased with one or more magnetic metal layers in the manner already described above while the remaining circuit is masked, and it is brought to the required inductance value. In the case of a transformer with two windings, the two spirals 19 and 20 may function as primary and secondary winding with the appropriate number of turns. The two inner ends of the windings can then be brought out beyond the spiral winding already printed by printing and firing of a "cross-over dielectric" in known manner.

Figure 6:
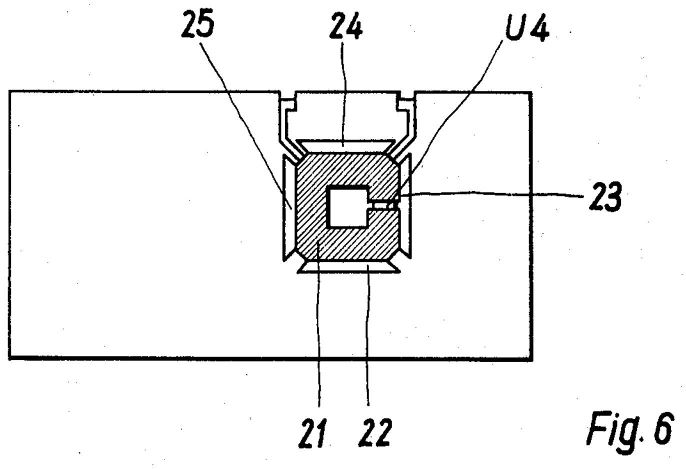
FIGURE 6 shows another embodiment of a component as in FIGURES 4 and 5.

Coils of the kind described can also be placed at any other desired points on the modular supporting plate, as illustrated diagrammatically in FIGURE 6, where the actual supporting region 21 (illustrated hatched) is separated from the remaining plate by a plurality of separating slits 22, 23, 24, 25.

In FIGURES 2 to 6, U2, U3, U4 are interruptions in the metal layers which prevent eddy currents.

In view of the magnetic skin effect, the thickness of the metal layers applied to the surface of the coil is matched to the required frequency range and to the particular application intended. In the case of oscillatory circuit coils or filter coils, the cut-off frequency of the layers must be sufficiently far above the working frequency, that is to say the layer must be sufficiently thin, to produce the required quality of coil. Electroless or galvanic deposition, however, permit without difficulty substantially thinner layers than the conventional rolling out of thin strips. For transformers, thicker layers may be used for the same frequency range. The number of individual layers applied one above the other which are necessary depends, inter alia, on the quality of coil required for the application or on the maximum variation in magnetic flux necessary. A single layer is sufficient in many applications.

As materials for the magnetic layer encasing the coil, the known iron-nickel alloys with from 36 to 81% of nickel are particularly advantageous and in the present state of the art can be deposited electroless or electrolytically with satisfactory repeatability without difficulty. The compositions suitable for various applications are selected in accordance with known rules, for example highly permeable alloys of the Permalloy type for transformers and low-frequency filter coils, other alloys with low alternating field losses for low-loss high-frequency filter coils, or iron-nickel alloy with 81% nickel, which assumes a magnetic anisotropy under the action of a magnetic field during deposition, for storage and switching elements. A considerable influence can also be exerted on the characteristics of the magnetic casing layers by means of the deposition conditions (for example current density and pH value), thus advantageously adapting them to the particular requirements. A magnetic field necessary for control purposes during the deposition of magnetic casing layers with magnetic anisotropy, can be produced by an auxiliary current in the actual coil to be encased.

In a further development of the invention, the inductive component can be brought to a prescribed inductance value during production simply by measuring the coil inductance continuously during the deposition of the last outer casing layer and interrupting the deposition manually or automatically when the desired value is reached, for example by switching off the current in the case of galvanic deposition.

I claim:

1. In an inductive circuit component, suitable for use in communication and data processing systems, having a coil arrangement with at least one coil, said coil arrangement being surrounded on all sides by a metallic, magnetic casing, said magnetic casing having an open-circuit gap extending parallel to the magnetic flux direction of said circuit component for preventing eddy currents, the improvement wherein said coil arrangement is covered with an insulating layer having a smooth external surface, and said magnetic casing comprises at least one continuous magnetic layer, electrically insulated from other ones thereof, deposited directly on said insulating layer-covered coil arrangement.

2. The improvement defined in claim 1, wherein said coil arrangement comprises a flat spiral copper conductor on at least one side of a foil of insulating material, the conductor surrounding a window in the foil.

3. The improvement defined in claim 2, wherein said foil of insulating material has a spiral copper conductor on each side thereof, the two conductors forming the primary and secondary windings of a transformer.

4. The improvement defined in claim 1 wherein said coil arrangement comprises a spiral conductor layer on at least one side of a part of a ceramic supporting plate, on the other parts of which are other circuit components.

5. The improvement defined in claim 1, wherein said layered magnetic casing has a substantially rectangular hysteresis loop whereby said inductive circuit component is rendered suitable for storage and switching.

References Cited

UNITED STATES PATENTS

| | | | |
|---|---|---|---|
| 2,850,707 | 9/1958 | Wroblewski et al. | 336—83 |
| 3,292,127 | 12/1966 | Dormaier | 336—229 XR |
| 3,325,760 | 6/1967 | Bernard | 336—83 XR |
| 2,114,031 | 4/1938 | Rust et al. | 336—83 XR |
| 2,584,592 | 2/1952 | Kehbel | 336—200 XR |
| 2,823,360 | 2/1958 | Jones. | |
| 2,948,871 | 8/1960 | Craige | 336—83 |
| 3,133,249 | 5/1964 | Parker | 336—200 XR |

FOREIGN PATENTS

| | | |
|---|---|---|
| 15,349 | 11/1933 | Australia. |
| 421,353 | 1935 | Great Britain. |
| 993,265 | 5/1965 | Great Britain. |
| 1,400,674 | 4/1965 | France. |

THOMAS J. KOZMA, Primary Examiner

U.S. Cl. X.R.

336—83, 65, 200